United States Patent

[11] 3,587,780

| [72] | Inventor | Harold R. Perriman |
| | | Westminster, Colo. |
| [21] | Appl. No. | 790,282 |
| [22] | Filed | Jan. 10, 1969 |
| [45] | Patented | June 28, 1971 |
| [73] | Assignee | Sundstrand Corporation |

[54] BEARING LUBRICATION DEVICE
8 Claims, 2 Drawing Figs.

[52] U.S. Cl................................................. 184/6,
308/134.1
[51] Int. Cl.................................................. F16n 9/02,
F01m 7/00
[50] Field of Search........................................ 184/6 (A),
6, 6 (W); 123/196 (S); 308/134.1, 169

[56] References Cited
UNITED STATES PATENTS

| 1,759,412 | 5/1930 | Noble | 184/(6UX) |
| 2,212,223 | 8/1940 | Barnes | 184/(6UX) |
| 2,370,854 | 3/1945 | Flanders | 308/134.1 |
| 2,905,510 | 9/1959 | Gardiner | 308/134.1 |
| 3,257,235 | 6/1966 | Steele et al. | 308/134.1X |
| 3,318,644 | 5/1967 | Johnson | 184/6X |

*Primary Examiner*—Manuel A. Antonakas
*Attorney*—Hofgren, Wegner, Allen, Stellman & McCord ABSTRACT: An auxiliary lubrication device for an axial thrust bearing assembly wherein a shaft thrust bearing is supplied lubricating oil from a lubrication pump including a thrust runner rotatable with the shaft with a bearing surface on one end thereof engaging a relatively stationary bearing surface and a reservoir either within the shaft itself or the rotating runner so disposed relative to the bearing surfaces that upon shaft startup lubricating fluid is temporarily supplied by centrifugal force pumping the fluid from the reservoir to the bearing surfaces.

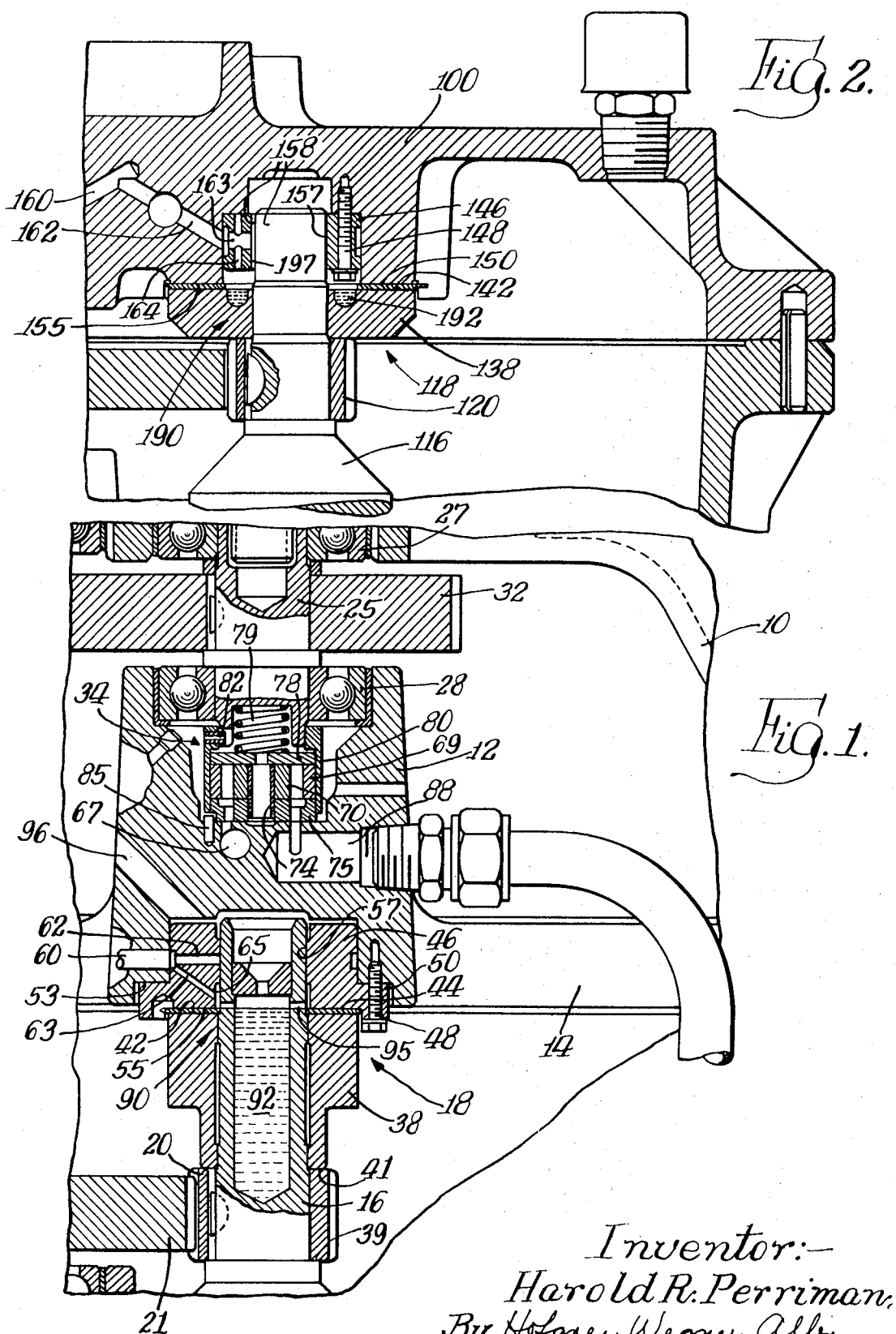

BEARING LUBRICATION DEVICE

BACKGROUND OF THE INVENTION

It is conventional to provide a thrust runner on the journaled end of a rotating shaft having a bearing surface thereon slidably engaging a relatively stationary bearing surface on a bearing journal for the purpose of absorbing the axial loads imposed on the shaft. In some cases a thrust washer is interposed between these bearing surfaces. For the purpose of lubricating these surfaces with hydraulic fluid under pressure to provide a hydrostatic thrust bearing it is well known in the art to provide the necessary lubrication passages between a lubrication pump and the bearing surfaces so that the lubrication pump provides a flow of lubricating fluid over the bearing surfaces as the thrust runner rotates.

A disadvantage encountered in this lubrication system is that the flow from the lubricating pump has been found to be insufficient on startup of the pump and the shaft to provide adequate lubrication for the bearing surfaces of the thrust bearing and thus, if the shaft is employed in a gearing assembly that is subjected to frequent startups and stops, detrimental wearing, excessive friction and even bearing failure can result from this inadequate transient lubrication problem.

SUMMARY OF THE PRESENT INVENTION

In accordance with the present invention, a lubrication system is provided for a shaft support of the type generally described above which is particularly adapted to provide a sufficient flow of lubricating fluid to a thrust bearing of a rotating shaft during startup when the main lubricating pump supplies an insufficient quantity of lubricating fluid to the bearing. To this end, the present lubrication system, in addition to a conventional lubricating pump, employs a reservoir within the shaft associated with the thrust runner, or in another embodiment a reservoir in the thrust runner itself, concentrically disposed with respect to the shaft with the top of the reservoir being positioned directly adjacent the radial thrust bearing surfaces and communicating therewith through appropriate passages so that upon startup of the shaft lubricating fluid will be immediately supplied from the reservoir through the passages under centrifugal force to the engaging bearing surfaces.

There is a sufficient quantity of fluid in the reservoir to provide adequate lubrication until the main lubrication pump supplies enough lubricating fluid to the bearing surfaces. Upon shut down of the shaft and main lubrication pump, the reservoir is refilled by connection with a tank or sump of the associated gearing and/or the inlet of the main lubrication pump.

BRIEF DESCRIPTION OF THE DRAWINGS

FIg. 1 is a fragmentary section of a portion of a gear box illustrating one form of the present invention; and FIG. 2 is a fragmentary section of a gear box incorporating another embodiment of the present invention.

DESCRIPTION OF THE PREFERRED EMBODIMENT

As illustrated in FIG. 1, a portion of a casing 10 is shown which defines part of the housing for a gear box adapted for example to be the gear box for a centrifugal pump.

The casing 10 includes a main bearing boss 12 supported therein by integrally formed struts 14. A high speed shaft 16 is vertically disposed in the casing 10 and supported at its upper end by a thrust bearing 18. Gear 20 is keyed to shaft 16 and is adapted to be driven by a gear 21 illustrated only partly in FIg. 1.

A low speed shaft 25 is also vertically disposed. It is supported in the casing 10 at its upper end by a roller bearing 27 and is supported at its lower end by a roller bearing 28. Low speed shaft 25 is adapted to drive a gear 32 keyed thereto.

The low speed shaft 25 has for one of its purposes the rotation of a main lubricating pump 34 which supplied lubricating fluid to the rotating components of the gear box.

In an exemplary application of the above-described gear box with a centrifugal pump, the low speed shaft 25 would be driven by a low speed electric motor or steam turbine and the high speed shaft 16 would drive a higher speed impeller of the pump.

The thrust bearing assembly 18 includes a stepped thrust runner 38 fixed to rotate with shaft 16. Upward axial thrust forces are transmitted to the thrust runner 38 through shoulder 39 of the shaft 16, gear 20 and the lower surface 41 of the thrust runner 38. A radial surface 42 on the upper end of the thrust runner 38 defines a bearing surface slidably engaging a thrust washer 44 having oppositely disposed bearing surfaces.

Fixed with respect to the upper bearing surface of the thrust washer is an annular journal bearing 46 fixed to the bearing boss 12 by suitable threaded fasteners 48 extending through an annular flange 50 on the bearing 46 seated within a counterbore 53 in the boss 12. Journal bearing 46 has a bearing surface 55 engaging the upper surface of the thrust washer 44, and it also has an annular bearing surface 57 slidably engaging the end of shaft 16 and providing a radial bearing for the shaft.

For the purpose of providing normal lubricating fluid to the bearing surfaces 42 and 57 to effect a hydrostatic bearing action, a main lubrication passage 60 is defined in the bearing boss 12 which communicates with the bearing surface 57 through radial passage 62 in the journal bearing 46 and with bearing surface 42 through a diagonal passage 63 in bearing 46 and an annular recess 65 extending upwardly from the surface on the journal bearing 46.

The main lubrication passage 60 is connected by suitable passages (not shown) to outlet 67 of the main gear pump of the main lubrication pump 34.

The main lubrication pump 34 is a gear pump of conventional construction and is of the general type disclosed in the Erikson et al. U.S. Pat. No. 3,343,494, assigned to the assignee of the present invention and reference should be made thereto for a more complete description thereof. Briefly, the gear pump includes an internally toothed outer gear 69 interengaging an externally toothed inner gear 70 mounted for rotation on a sleeve 74 fixed in an indexing plate 75. The gears are biased into sealing engagement with the indexing plate 75 by a sealing plate 78 urged downwardly by spring 79. The outer gear 69 is driven by a sleeve 80 fixed to the shaft 25 by a pin 82. The sleeve also extends over the indexing plate 75 and frictionally engages the periphery thereof so that as shaft 25 reverses rotation, the frictional engagement between sleeve 80 and indexing plate 75 will reverse the ports in the plate 75 by 180° rotation thereof, limited by stationary indexing pin 85, for the purpose of maintaining a unidirectional output from the lubrication pump. That is, the outlet port 67 is always the outlet port and port 88 is always the inlet port regardless of the direction of rotation of shaft 25.

As discussed generally above, the main lubrication pump 34 when used in a gear box that encounters frequent startups provides inadequate lubrication to the bearing surfaces 42 and 57 during these transient periods since the flow therefrom at these times is insufficient to provide proper bearing lubrication. To reduce this problem and provide adequate lubrication during this period an auxiliary lubrication device 90 is provided integrally with the thrust bearing 18. Lubrication device 90 includes a reservoir 92 defined by a closed ended bore axially disposed in the end of the high speed shaft 16. Formed in the shaft 16 adjacent the annular recess 65 and the bearing surface 42 are radial passages 95 which communicate both with the interior reservoir 92 and the annular recess 65.

As the shafts 25 and 16 begin rotation on startup and the main pump 34 is providing inadequate lubrication to the bearing surfaces, the centrifugal force acting on the fluid in reservoir 92 will force the fluid under pressure out radial passages 95 and into the recess 65 and from there the lubrication fluid will flow across bearing surface 57 as well as bearing surface 42 providing adequate bearing lubrication during this startup period. The reservoir 92 is refilled at the time of shutdown by fluid draining from the lubrication passage 60 as well as from a diagonal passage 96 in the bearing boss 12 which communicates with the sump. Passage 96 also provides an escape for excess fluid to drain.

In FIG. 2 a somewhat modified form of the present invention is illustrated and is seen to include a high speed shaft 116 having its upper end rotatably mounted in a gear box casing 100 by a thrust bearing assembly 118. It should be understood that the bearing 118 is normally provided with lubrication fluid through passages 160 and 162 from a gear pump similar to gear pump 34 in the same manner as in the FIG. 1 embodiment.

The thrust bearing 118 in the FIg. 2 embodiment is seen to include a thrust runner 138 rotatable with the high speed shaft 116 and urged upwardly by the upward axial loading of shaft 116 through gear 120.

The stationary radial thrust surface in the FIG. 2 embodiment is provided by radial surface 155 formed integrally in the casing 100. A thrust washer 150 is provided between the surfaces 142 and 155 in a manner similar to thrust washer 50 in the FIG. 1 embodiment and the washer is stationary with respect to journal bearing 146 so that surface 142 slidably engages the thrust washer.

For the purpose of radially supporting the shaft 116, journal bearing 146 is provided at the upper end of shaft 116 and fixedly mounted within a counterbore in casing 100 by suitable fasteners 148. The journal bearing 146 has an annular bearing surface 157 slidably engaging surface 158 on shaft 116.

For the purpose of providing normal lubrication from passage 162 to the bearing surfaces, the bearing 146 is provided with a radial passage 163 which communicates with the bearing surface 157 and which also communicates with the bearing surface 142 through axial passages 164.

To supply adequate lubricating fluid during startup of the lubrication pump associated with the passage 160, an auxiliary lubrication device 190 is provided performing a function similar to that provided by lubrication device 90 in the FIG. 1 embodiment. Toward this end, an annular lubrication reservoir 192 is provided in the thrust runner 138. The reservoir 192 is formed in the bearing surface 142 and extends downwardly therefrom and is adjacent at its upper end to the thrust washer 150. During startup fluid in the reservoir 192 is thrown or pumped radially outwardly across the bearing surface 142 by centrifugal force lubricating the surfaces and also flows upwardly through axial slots 197 in the journal 146 to provide adequate lubrication for the bearing surface 157 during this transient period. Before the fluid is depleted in reservoir 192, the main lubrication pump supplies sufficient fluid to satisfy the radial and axial bearings defined by bearing surfaces 142 and 157.

I claim:

1. A lubrication device for an axial thrust bearing; a rotatable shaft member positioned on a vertical axis, a rotatable thrust runner member surrounding said shaft member and rotatable therewith, relatively stationary bearing means above said thrust runner member, said thrust runner member and said bearing means having interrelated bearing surfaces, means normally supplying lubricating fluid to said bearing surfaces, auxiliary means for lubricating said bearing surfaces including a reservoir in one of said members coaxially disposed with respect to the axis of rotation of said shaft member, said bearing surfaces being disposed radially outwardly of said reservoir, means providing communication between said reservoir and said bearing surfaces so that upon rotation of said reservoir fluid therein will be thrown centrifugally outward toward said bearing surfaces, and means separate from fluid between said bearing surfaces for filling said reservoir.

2. A lubrication device as defined in claim 1, wherein said reservoir is defined by a central bore in the end of said shaft member, and generally radial passage means in said shaft member communicating with said reservoir, said generally radial passage means being adjacent said bearing surfaces.

3. A lubrication device as defined in claim 1, wherein said reservoir is defined by an annular chamber in said rotatable bearing member surrounding said shaft member.

4. A lubrication system for a shaft bearing, comprising: a shaft member, a bearing member carried by said shaft member, relatively stationary bearing means adjacent said bearing member, said bearing member and bearing means having interrelated bearing surfaces, a main lubrication pump for supplying lubricating fluid to said surfaces, passage means between said main pump and said surfaces, lubrication means for supplying fluid to said bearing surfaces during startup of said main lubrication pump including a reservoir in one of said members substantially coaxially disposed with respect to said members, means communicating said reservoir with said bearing surfaces so that upon rotation of the reservoir fluid therein will be thrown centrifugally outward toward said bearing surfaces, and means separate from said bearing surfaces for filling said reservoir upon shut down of said main lubrication pump, including unrestricted passage means above said reservoir connected to receive drain fluid from said main lubrication pump.

5. A lubrication system as defined in claim 4, wherein said reservoir defined by a central bore in the end of said shaft member, and generally radial passage means in said shaft member communicating with said reservoir, said generally radial passage means being adjacent said bearing surfaces.

6. A lubrication system as defined in claim 4, wherein said reservoir is defined by an annular chamber in said rotatable bearing member surrounding said shaft member.

7. A lubrication system for a shaft bearing, comprising: a shaft member, a bearing member carried by said shaft member, relatively stationary bearing means adjacent said bearing member, said bearing member and bearing means having interrelated bearing surfaces, a main lubrication pump for supplying lubricating fluid to said surfaces, passage means between said main pump and said surfaces, lubrication means for supplying fluid to said bearing surfaces during startup of said main lubrication pump including a reservoir in one of said members substantially coaxially disposed with respect to said members, means communicating said reservoir with said bearing surfaces so that upon rotation of the reservoir fluid therein will be thrown centrifugally outward toward said bearing surfaces, means for filling said reservoir upon shutdown of said main lubrication pump, said reservoir being defined by the central bore in the end of said shaft member, generally radial passage means in said shaft member communicating with said reservoir, said generally radial passage means being adjacent said bearing surfaces, said bearing member being a thrust runner fixed to said shaft member, and said shaft member being vertically disposed, said reservoir extending below the bearing surface of said thrust runner, said bearing means including a journal bearing, a thrust washer engaging the bearing surfaces of said thrust runner and said journal bearing.

8. A lubrication system for a shaft bearing, comprising: a shaft member, a bearing member carried by said shaft member, relatively stationary bearing means adjacent said bearing member, said bearing member and bearing means having interrelated bearing surfaces, a main lubrication pump for supplying lubricating fluid to said surfaces, passage means between said main pump and said surfaces, lubrication means for supplying fluid to said bearing surfaces during startup of said main lubrication pump including a reservoir in one of said members substantially coaxially disposed with respect to said members, means communicating said reservoir with said bearing surfaces so that upon rotation of the reservoir fluid therein will be thrown centrifugally outward toward said bearing surfaces, means for filling said reservoir upon shutdown of said main lubrication pump, said reservoir being defined by an annular chamber in said rotatable bearing member surrounding said shaft member, said bearing member being a thrust runner rotatable with said shaft member, said shaft member being disposed for rotation about a generally vertical axis, said bearing surfaces being radially disposed, the top of said reservoir being substantially coplanar with the bearing surface on said thrust runner, and a thrust washer between said thrust member and said bearing means.